United States Patent [19]

Eastman

[11] Patent Number: 5,319,731
[45] Date of Patent: Jun. 7, 1994

[54] FIBER-OPTIC ARRAY OF LIMITED ACCEPTANCE ANGLE

[75] Inventor: Clarke K. Eastman, Rochester, N.Y.

[73] Assignee: Eastman Kodak Company, Rochester, N.Y.

[21] Appl. No.: 955,791

[22] Filed: Oct. 2, 1992

[51] Int. Cl.$^5$ ............................................... G02B 6/04
[52] U.S. Cl. ................................... 385/115; 385/116; 385/121; 385/127
[58] Field of Search ................ 385/28, 29, 30, 115, 385/116, 120, 121, 123, 126, 127

[56] References Cited

U.S. PATENT DOCUMENTS

| | | | |
|---|---|---|---|
| 2,979,632 | 4/1961 | MacNeille | 313/89 |
| 3,060,789 | 10/1962 | Hicks, Jr. | 88/1 |
| 3,141,105 | 7/1964 | Courtney-Pratt | 313/68 |
| 3,237,039 | 2/1966 | Fyler | 313/92 |
| 3,253,500 | 5/1966 | Hicks, Jr. | 88/1 |
| 3,273,445 | 9/1966 | Siegmund | 88/1 |
| 3,582,297 | 6/1971 | Lakeman | 65/4 |
| 4,533,210 | 8/1985 | Jeskey | 385/120 |
| 4,591,232 | 5/1986 | Jeskey | 385/120 |
| 4,761,062 | 8/1988 | Loce et al. | 385/116 |
| 4,904,049 | 2/1990 | Hegg | 385/120 |
| 4,974,930 | 12/1990 | Blyler, Jr. et al. | 385/28 |
| 5,052,776 | 10/1991 | Fukushima et al. | 385/116 |
| 5,256,868 | 10/1993 | Kaplan et al. | 250/208.1 |

OTHER PUBLICATIONS

"Fiber Optics" by W. P. Siegmund, pp. 1–29 in *Applied Optics and Optical Engineering*, R. Kingslake, ed., vol. IV, Academic Press: New York, 1967.
*Fiber Optics: Theory and Practice*, by W. B. Allan, Plenum Press: London 1973, pp. 119–121, 141–147.

*Primary Examiner*—Frank Gonzalez
*Attorney, Agent, or Firm*—David M. Woods

[57] ABSTRACT

A fiber-optic array includes a plurality of optical fibers, each encased by a cladding material that significantly absorbs light. The refractive indices of the fiber core and its cladding are selected such that the acceptance angle of each fiber includes all rays incident upon the face of the fiber. Thus no unguided light enters one fiber and exits another fiber, and flare is controlled. By further having the cladding preferentially absorb totally internally reflected off-axis rays, the "effective" acceptance angle is limited to a value that provides increased depth of field in applications, e.g., involving film scanning.

7 Claims, 5 Drawing Sheets

FIBER-OPTIC ARRAY OF LIMITED ACCEPTANCE ANGLE

FIELD OF INVENTION

This invention pertains to a group of optical fibers bundled together into an array for the purpose of transmitting an image.

BACKGROUND OF THE INVENTION

In known glass-clad fiber-optic arrays, both the fiber and the cladding are made of non-absorbent material to minimize transmission loss through each fiber. If the refractive index $n_1$ of the fiber core and the refractive index $n_2$ of the fiber cladding are sufficiently different that $$n_1^2 < n_2^2 + 1$$

then the acceptance half-angle for rays impinging upon the input face of each fiber is at a maximum, namely, 90°. This means that light at all incident angles is transmitted by total internal reflection down the fiber (except for small losses due to Fresnel reflection at the input and exit faces). In an imaging system using such an array, the depth of field is very shallow. Moreover, in utilizing diffuse illumination to suppress the effect of scratches on a scanned original, the collection of widely off-axis rays produces noticeable image blurring.

In order to reduce the aforementioned blurring and to increase depth of field of an imaging system to a useable range, it is necessary to decrease the acceptance angle. The conventional approach has been to decrease the difference between the refractive indices of the core and cladding so that the above inequality does not hold. As this difference decreases, the acceptance angle decreases. The problem then is that light rays striking the input face of the fibers at greater than the acceptance angle are not internally reflected, and instead transmit through the fiber walls to exit through another fiber. This generates flare light that severely degrades resolution in an imaging system. High quality film scanners, for example, must operate under extremely low levels of flare light to read the full dynamic range of densities and to capture the fine details of film images.

If the cladding or the interstitial spaces between fibers can be adapted to attenuate stray light within the fibers, then this problem can be alleviated to some extent. In U.S. Pat. No. 3,060,789 the cladding of a fiber is formed of a light-absorbing glass having absorption characteristics selected such that substantially only the light entering the fiber within the acceptance angle of the fiber will be transferred through the fiber, whereas light entering the fiber at angles beyond the acceptance angle will be absorbed by the cladding. Another technique is to add an array of small light-absorbing fibers located interstitially among the light-conducting fibers. The absorbing material, usually a dark glass, gradually absorbs the stray light as it wanders through the plate. The thicker the plate the more effective the absorption. Such a material is often referred to as extramural absorption, or EMA, material (see "Fiber Optics" by W.P. Siegmund, pp. 1-29 in *Applied Optics and Optical Engineering*, R. Kingslake, ed. Vol. IV, Academic Press: New York, 1967). The problem with such techniques is that enough unguided light is still passed through the fiber-optic array to cause significant flare. Moreover, the light absorbing cladding inherently absorbs, at each reflection, a small portion of the light which entered the fiber within its maximum acceptance angle.

The latter problem can be alleviated to some extent by providing a multiple coating or cladding on the core of the fiber (see U.S. Pat. No. 3,253,500). The fiber comprises a core of a relatively high index flint glass or the like having an inner coating or cladding of a clear relatively low index crown glass and an outer coating or cladding of a light-absorbing glass. Since the inner cladding, being a clear crown glass, will not absorb light, substantially all of the light within the acceptance angle of the fiber will be internally reflected at the interface and transferred through the fiber without in any way contacting the outer light-absorbing cladding. As with prior arrays, some unguided light, that is, light entering the fiber beyond its maximum acceptance angle, is still passed through the array to cause flare.

In the known structures cited above, the refractive indices of the core and cladding are such that the some input angles of incidence do not result in total internal reflection. U.S. Pat. No. 3,582,297 discloses a fiber-optic array structure for which the refractive indices are chosen such that all input rays are transmitted through the fiber. The problem now is that some rays enter the array through the glass cladding itself and obliquely travel through the structure, passing several times through the clad fibers and thus causing flare. According to this patent, an ion exchange process operative along the facial surface of the array darkens the cladding to a depth of 10 to 20 microns (approximately 1% of the thickness, top to bottom, of the array). This is said to absorb the radiation incident upon the cladding without causing unduly large absorption of the radiation captured by the core. However, the depth of field, as mentioned before, remains too shallow for use with high resolution image scanners.

SUMMARY OF THE INVENTION

An undesirable trait of optical fibers is that some of the light accepted into the core will be slightly absorbed at each reflection. Since the number of reflections and the depth of penetration into the cladding sheath increases with increasing incidence angles, this absorption will be greater for the higher angles. This has the effect of giving an effective acceptance angle of less than the theoretical.

The present invention recognizes the angular dependence of this effect, and utilizes it to tailor the acceptance angle to provide the increased depth of field necessary for film scanning.

The invention provides a fiber-optic array device having minimal flare, yet having a reduced acceptance angle suitable for imaging applications. The fibers and cladding constituting the array have indices of refraction selected such that substantially all light rays entering the ends of the fibers are guided through each fiber by total internal reflection. Accordingly, some of the light accepted into the core comes from oblique off-axis rays. By including a light absorptive material in the cladding that absorbs a portion of the light rays at each internal reflection such that off-axis rays experience greater attenuation, the effective acceptance angle at the input ends of the fibers may be reduced and the depth of field may be accordingly increased.

The advantage of the invention is that no unguided light that enters one fiber exits another. The absorptive cladding selectively attenuates light incident at large angles while passing on-axis light substantially unattenuated. The result is an effectively reduced acceptance cone whose cutoff angle can be tailored to a given system. Light incident outside of this effective acceptance cone is attenuated but still confined to a given fiber by total internal reflection. In an imaging system, depth of field is improved without introducing flare. Moreover, the fiber-optic array will reject light rays emanating at wide angles from, e.g., film illuminated by a diffuse source. This allows operation of scratch suppression without introducing blur.

BRIEF DESCRIPTION OF THE DRAWINGS

The invention will be described in relation to the drawings, in which.

DESCRIPTION OF THE PREFERRED EMBODIMENTS

Since bundled arrays of optical fibers are well-known structures, the present description will be directed in particular to elements forming part of, or cooperating more directly with, the present invention. More specifically, the optical fiber structure of the present invention is shown for use with an optical scanner in which transparent material such as slides, negatives, or movie film is scanned. Since such scanners are well-known in the art, scanner elements not specifically shown or described herein may be selected from those known in the art. The invention, however, may be used in other applications, such as a fiber optic faceplate for a cathode ray tube.

Figure 1:
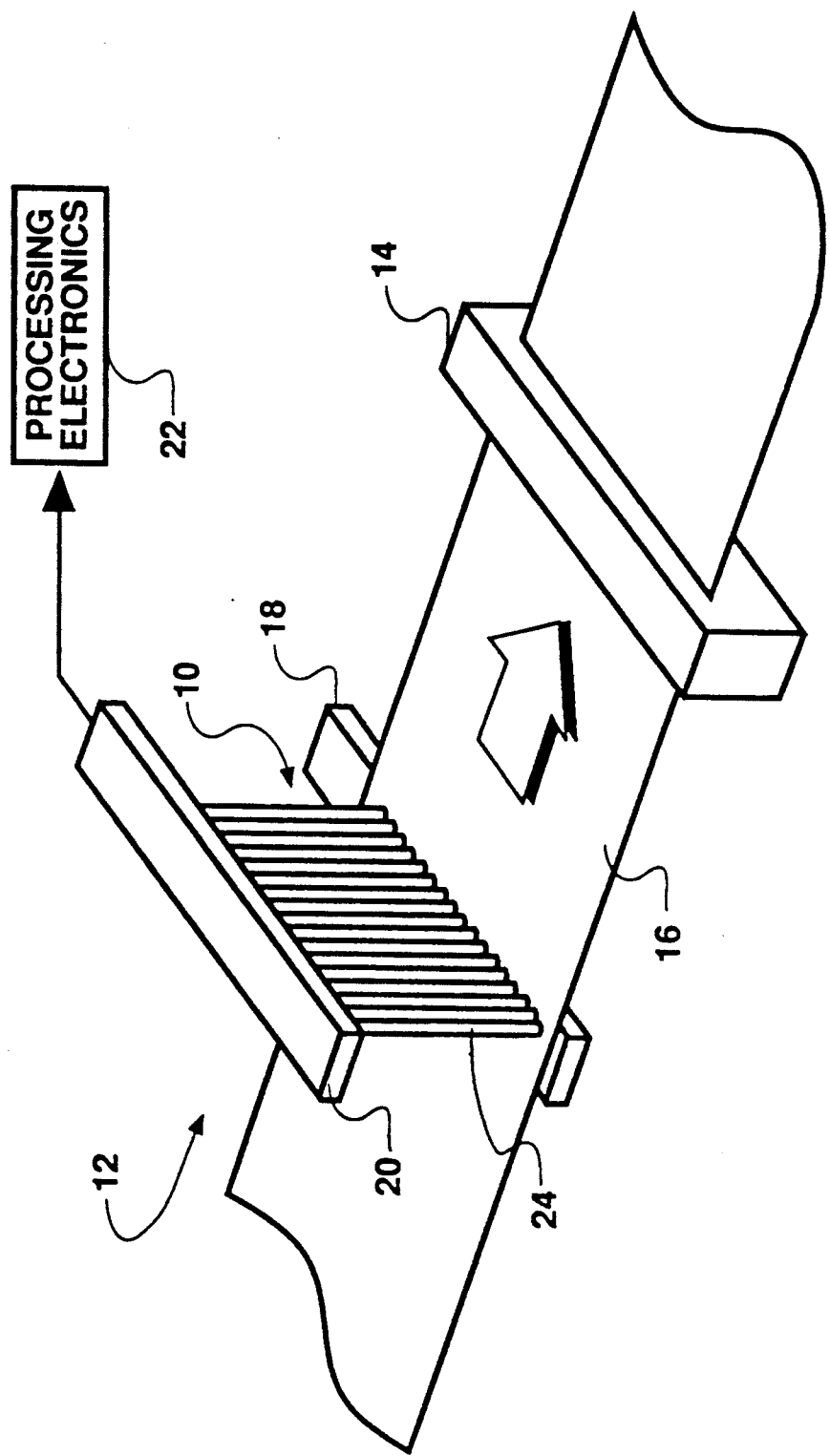
FIG. 1 is a perspective view of a film scanner utilizing a fiber-optic array in accordance with the invention.

Referring to FIG. 1, a fiber optic array 10 is shown for use in a film scanner 12 to transmit an image between a film 16 and a photoelectric sensor 20. The scanner includes means 14 (such as a sprocket wheel or a capstan) for moving the transparent film 16 between a linear diffuse light source 18 and the photoelectric sensor 20. The sensor 20 is, for example, a linear array of discrete sensor elements that provides a line-by-line scan of image data to processing electronics 22. The fiber optic array 10 includes a linear structure of optical fibers 24 interposed along an optical axis between the illuminated film 16 and the sensor 20. As better shown in partial cross-section in FIG. 2, each fiber 24 is surrounded by a sheath of cladding 26, which binds the fibers 24 into a fixed linear orientation. That is, the fibers 24 are carefully arranged so that their terminations occupy the same relative positions in both of the bound ends of the bundle. Such a bundle of fibers is said to be coherent, and is capable of transmitting images. Thus, in the scanner of FIG. 1, image data obtained by illuminating individual lines of the film 16 is coherently transmitted to the sensor 20. Depending upon the requirements of the scanner 12, the fiber optic array 10 may be a flexible bundle of fibers that allow various placements of the sensor 20, or the array 10 may be a fused, rigid plate directly interposed between the sensor 20 and the film 16, as shown by FIG. 1.

Figure 5:
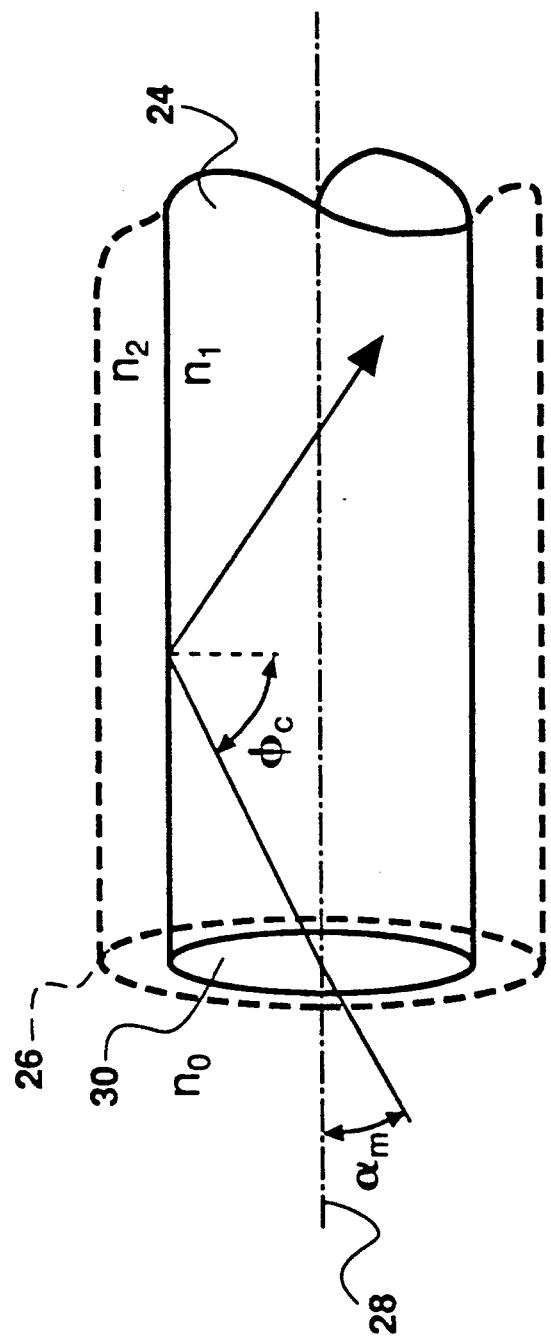
FIG. 5 is a ray path diagram through an optical fiber, which is useful in explaining the invention.

Each fiber 24 is designed to internally reflect all light entering its input face. To understand this, consider the case as shown in FIG. 5 of a straight cylindrical fiber 24 with a refractive index $n_1$ embedded in (or clad with) a medium 26 of refractive index $n_2$, where $n_1 > n_2$. A ray of light passing through the fiber axis 28 from a medium of refractive index $n_0$ is incident onto the perpendicular end face 30 of the fiber at an angle $\alpha$. This ray will be refracted at the end face 20 and will be totally reflected at the fiber wall if its angle of incidence against the fiber wall is greater than the critical angle $\phi_c$. As described in the aforementioned Siegmund article, the maximum value of $\alpha_m$ for which the ray will be totally reflected can be derived from Snell's law and simple trigonometry, and leads to the following relationship:

$$n_0 \sin \alpha_m = (n_1^2 - n_2^2)^{\frac{1}{2}} \qquad (1)$$

By analogy with lens optics, the term $n_0 \sin \alpha_m$ is called the numerical aperture and is a measure of the light gathering power of the fiber. Accordingly, $\alpha_m$ is the half-angle of the acceptance cone of the fiber, and is one-half of the acceptance angle, as the term is used herein. Rays incident on the face 30 at greater than $\alpha_m$ will strike the fiber wall at angles less than $\phi_c$. Such rays will not be totally internally reflected and will quickly leak out of the fiber 24. As appreciated from the structure shown in FIG. 2, such rays could leak into adjoining fibers and eventually cause flare at the output of the array 10.

From an inspection of equation (1) it may be appreciated that the respective indices $n_1$ and $n_2$ of refraction for the fiber and cladding may be chosen ($n_1$ sufficiently larger than $n_2$) so as to force the $\sin \alpha_m$ to equal one. For air at the input, (i.e., $n_0 \approx 1$), this means that the largest numerical aperture equals one. Therefore, if the refractive indices of the core and cladding are sufficiently different that $$n_1^2 > n_2^2 + 1 \qquad (2)$$

light at all incident angles is transmitted through fiber (except for small losses due to Fresnel reflection at top and bottom faces). In this case, the angle $\alpha_m$, the half-angle of the acceptance cone, equals 90° and the fiber totally internally reflects all light entering its face 30. While this may seem to be a desirable condition to achieve, in practice a film scanner must have the input ends of the fibers spaced from the film to prevent scratching of the moving film. Consequently, the depth of field must be increased by decreasing the numerical aperture, and thus decreasing the acceptance angle. This leads to the aforementioned problem with off-axis rays escaping from the fiber and causing flare.

Figure 2:
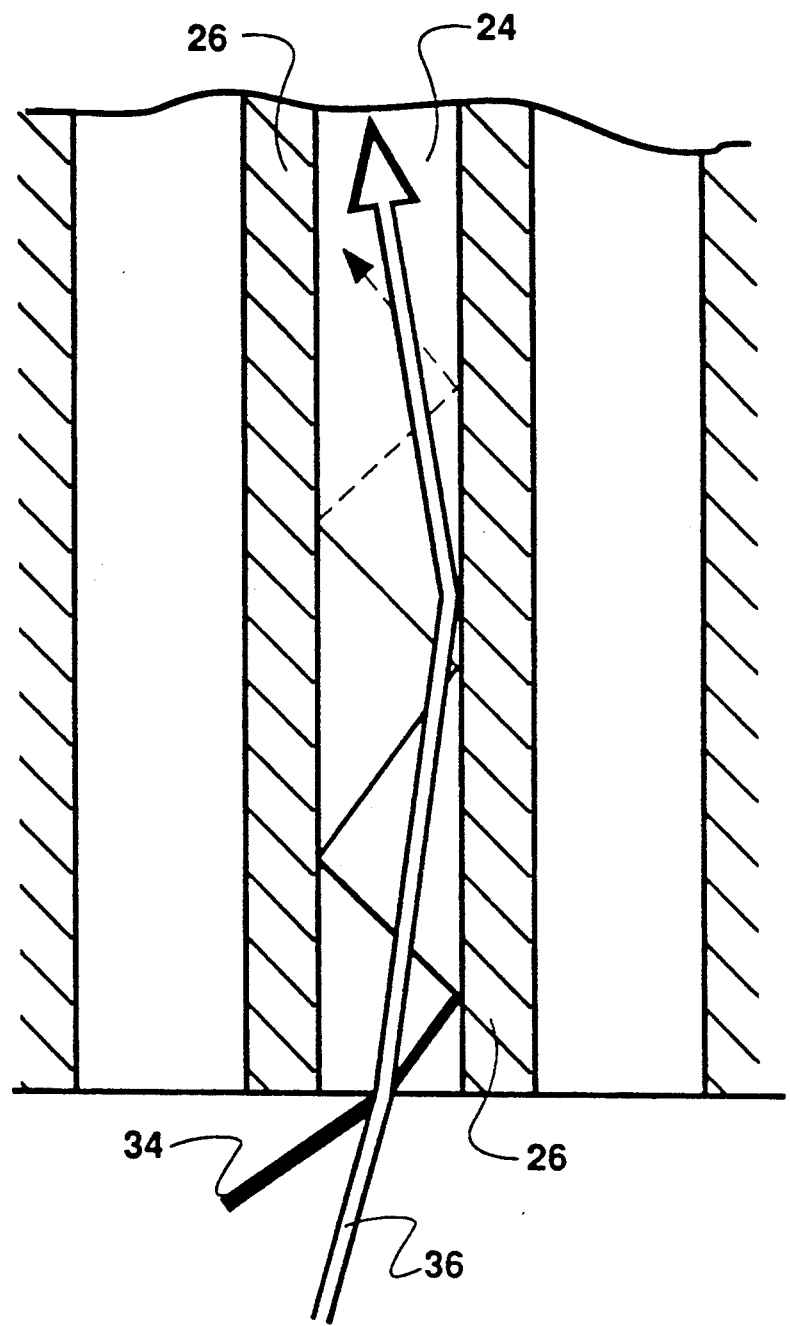
FIG. 2 is a cross-sectional view of the fiber-optic array of FIG. 1.

According to the invention, the "nominal" acceptance half-angle of the input faces of the fibers constituting the array 10 is kept at the maximum, that is, 90°, to minimize flare induced by off-axis rays, while the "effective" acceptance angle is reduced by preferentially absorbing off-axis rays so as to increase the depth of field. As shown in FIG. 2, this is done by providing a cladding 26 that is significantly absorptive of light. As noted before, some of the light entering the fiber core 26 within the acceptance angle will be slightly absorbed at each reflection. Since the number of reflections and the depth of penetration into the cladding increases with increasing incidence angles, this absorption will be greater the further the rays are off axis. As noted in FIG. 2, an off-axis ray 34 makes more reflections against the fiber wall than a more-nearly on-axis ray 36. In other words, the more oblique (off-axis) rays undergo more reflections to travel through a fiber and undergo further attenuation at each of these reflections.

Figure 4:
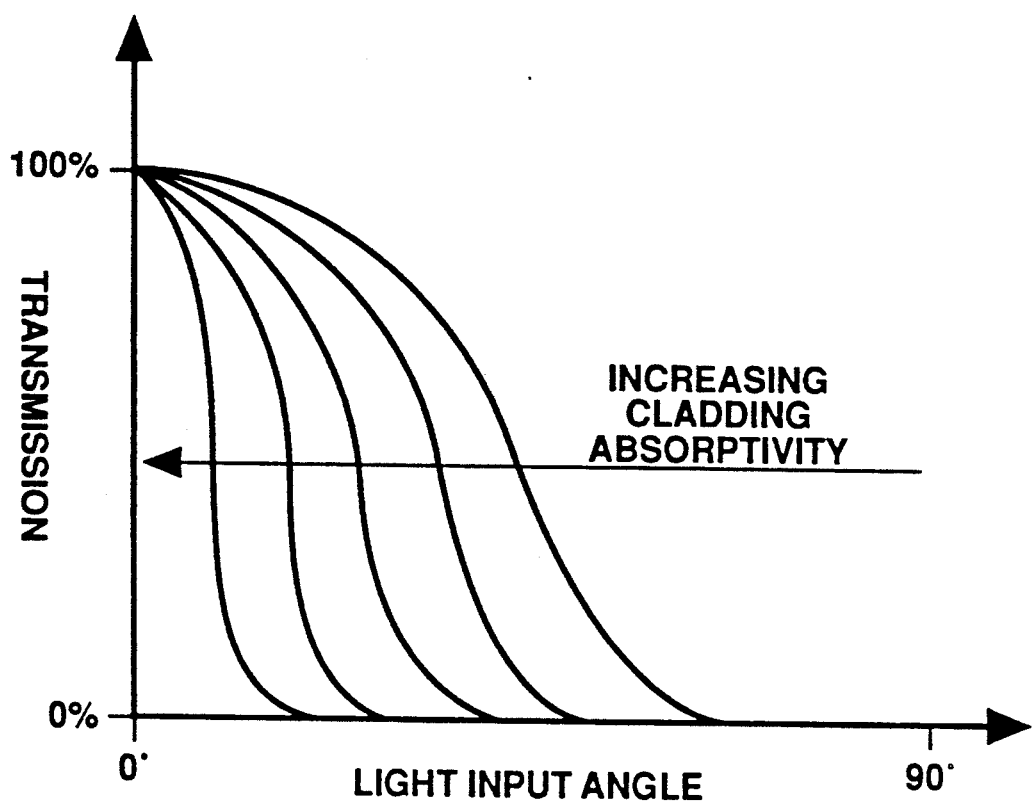
FIG. 4 is a diagram illustrating the effect of the light input angle upon the degree of transmission for increasing levels of cladding absorptivity.

As shown diagrammatically in FIG. 2, the intensity of the off-axis ray 34 is significantly diminished by absorption after a number of reflections. The transition from complete transmission to complete absorption of off-axis rays is not perfectly abrupt, but one may refer to the angle where there is 50% attenuation as a "cutoff" angle. As shown in FIG. 4, this effect can be controlled for a given fiber length by adjusting the absorptivity of the cladding glass. In other words, the "cutoff" angle can be tailored for the particular requirements (e.g., depth of field) of the system utilizing the fiber optic array. It is possible to further tailor the "cutoff" angle by adjusting the depth of the absorption. Unlike the array described in the aforementioned U.S. Pat. No. 3,582,297, which darkens a few microns of the cladding to absorb radiation incident on the cladding, the present embodiment attenuates off-axis rays incident on the core (and therefore bound to a given fiber). Attenuation of these rays, compared to the cladding radiation, requires a relatively larger number of reflections, since a much smaller absorption takes place for each reflection as the ray travels down the fiber. While use of cladding that absorbs along the entire length of the fiber appears to be preferable, it may prove that less than the full array thickness is acceptable. Thus varying the thickness, top to bottom, of the absorptive region may be used to further tailor the "cutoff" angle.

Numerous methods for increasing the light absorption of a cladding glass are well known in the art—see, e.g., the disclosures of U.S. Pat. Nos. 3,060,789; 3,253,500; and 3,273,445. Each of these patent disclosures are incorporated with the present disclosure by reference. For example, as described in the aforementioned 3,060,789, a neutral light absorbing crown glass suitable for use in forming a light absorbing cladding may be formed by mixing equal quantities of chromic oxide and gold chloride with a relatively low index crown glass during the making of the crown glass in amounts controlled in accordance with the degree of light absorption desired in the glass. It is emphasized, however, that this invention is not restricted to any particular glass composition since the techniques used to produce light-absorbing glass are numerous and well known in the glass making industry. Likewise, techniques for the manufacture of fiber optic arrays are well known.

Cladding with a wide range of absorptivity is expected to perform successfully according to the invention. For example, for a 1 cm thick fiber-optic bundle and core diameter of 5 microns, absorption coefficients on the order of 10/mm to 100/mm (if the cladding were measured in transmission) would be expected to give the desired cutoff characteristics. However, since this is only an estimate based on a simple model, it would be reasonable to expect absorption coefficients between 1/mm and 1000/mm to be useful in other situations. More particularly, for a given bundle length, a higher cladding absorption constant should have a narrower angular acceptance. Likewise, for a given absorption constant, a longer bundle should also have a narrower angular acceptance and, for a given cladding absorption and bundle length, a larger core diameter should have a wider angular acceptance.

Figure 3:
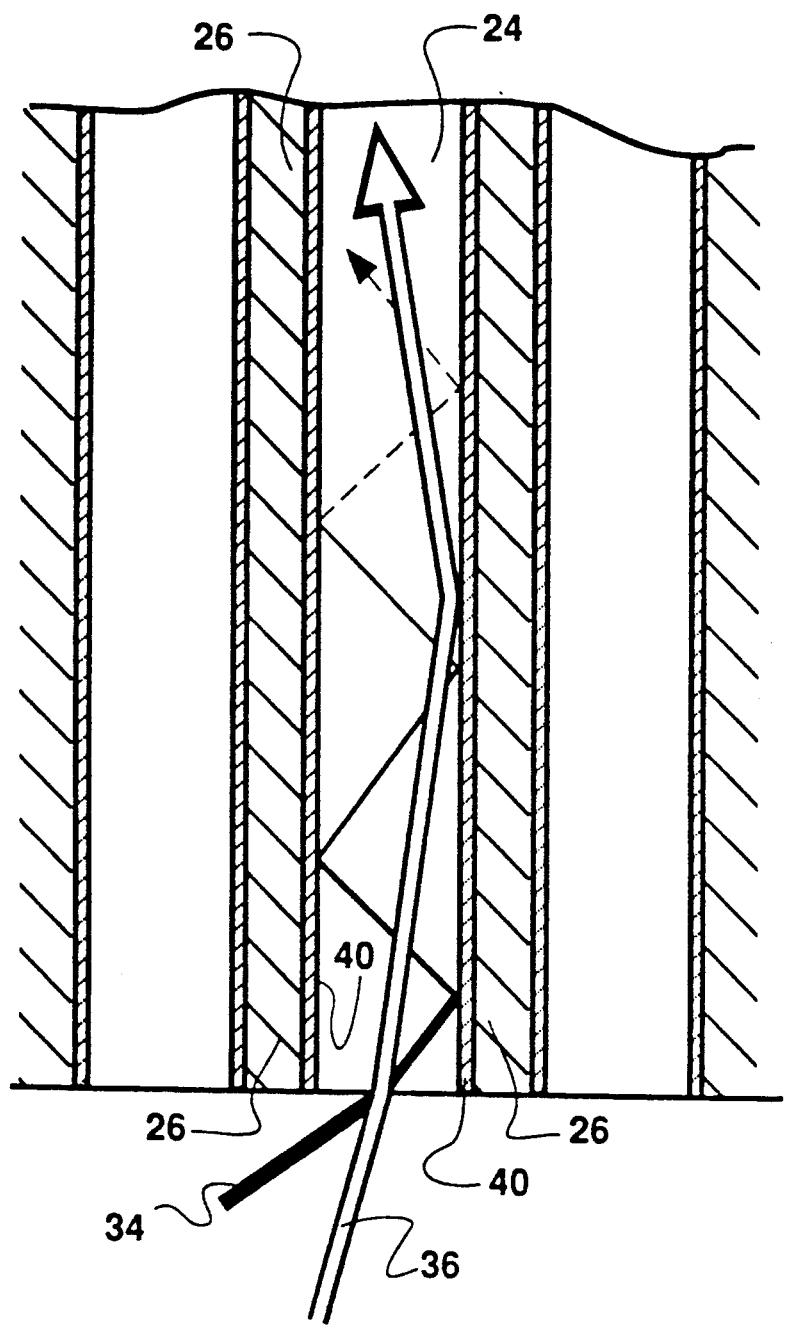
FIG. 3 is a cross-sectional view of a further embodiment of a fiber-optic array according to the invention.

In the second embodiment of the invention shown in FIG. 3, an extremely thin (on the order of one wavelength of light or less) layer of nonabsorptive cladding 40 is interposed between the fiber core 24 and the absorptive cladding 26. This is expected to provide a more abrupt angular cutoff between transmission and absorption, based on the fact that off-axis rays will more selectively be attenuated at each reflection. The attenuation versus angle characteristics, such as shown in FIG. 4, can be adjusted through the absorptivity of the outer cladding 26 and the thickness of the inner cladding layer 40. More specifically, in the structure of FIG. 2, for a given core diameter and bundle length, one variable substantially controls angular acceptance: the cladding's absorption constant. In the structure of FIG. 3, on the other hand, the thickness of the inner cladding and the absorption of the outer cladding gives more freedom to adjust the attenuation vs. angle characteristics. Physically, what is happening is that off-axis rays penetrate farther into the cladding during each reflection. In FIG. 2, with only one cladding layer, there will be some attenuation for "nearly on-axis rays. In FIG. 3, the nearly on-axis rays will slightly penetrate the inner (transparent) cladding but not the outer (absorbing) cladding and thus will not be attenuated. The severely off-axis rays will penetrate into the outer cladding and be attenuated, as desired.

The invention has been described in detail with particular reference to presently preferred embodiments, but it will be understood that variations and modifications can be effected within the spirit and scope of the invention.

What is claimed is:

1. A fiber-optic array having a reduced acceptance angle for increased utility with imaging devices requiring enhanced depth of field, said array including a plurality of optical fibers each surrounded by cladding and oriented lengthwise with respect to an optical axis, the improvement wherein:

the fiber and cladding have respective indices of refraction selected such that the numerical aperture of each fiber is greater than or equal to one, thereby providing a maximum acceptance half-angle of 90° and total internal reflection of substantially all light rays entering the end of the fiber, whereby some of the light accepted into the fiber through internal reflection is from oblique off-axis rays, and wherein the cladding includes a light absorptive material having an absorption coefficient of at least 1/mm that significantly attenuates a portion of the oblique off-axis rays at each internal reflection such that the oblique off-axis rays are more greatly attenuated due to the larger number of reflections and the effective acceptance angle of the incoming rays is reduced so as to be substantially equal to the reduced acceptance angle needed for enhanced depth of field.

2. A fiber-optic array as claimed in claim 1 wherein the cladding is absorptive of light over its complete thickness.

3. A fiber-optic array as claimed in claim 1 wherein said cladding is absorptive of light over substantially its entire lengthwise dimension.

4. A fiber-optic array as claimed in claim 1 wherein the cladding comprises a thin layer of nonabsorptive cladding and a thicker layer of absorptive cladding, the nonabsorptive cladding being interposed between the fiber core and the absorptive cladding to effect a more selective attenuation of the off-axis rays at the interface between the fiber core and the cladding.

5. A fiber-optic array as claimed in claim 4 wherein the nonabsorptive cladding has a thickness less than one wavelength of light.

6. Apparatus for scanning a transparent material, comprising:
- a light source for illuminating a line of the transparent material;
- a light sensor including a linear array of sensing elements;
- a fiber-optic array oriented along an optical axis between the transparent material and said light sensor to transmit an image of the illuminated line to the respective elements of the linear array, said fiber-optic array including a plurality of optical fibers each composed of a core surrounded by cladding and having a numerical aperture of at least one, said fiber-optic array transmitting substantially all light striking an input face thereof through the cores by total internal reflection, the cladding including a light absorptive material having an absorption coefficient of at least 1/mm that significantly attenuates a portion of the oblique off-axis rays at each internal reflection such that the oblique off-axis rays are more greatly attenuated due to the larger number of reflections, the effective acceptance angle of the fiber is reduced due to absorption of off-axis rays, and the depth of field at the input face of the fiber-optic array is increased, and
- means for moving the transparent material between said light source and the input face of he cores comprising the fiber-optic array so as to produce line-by-line scanning of the transparent material.

7. A fiber-optic array including a plurality of optical fibers each composed of a fiber core surrounded by cladding and oriented lengthwise with respect to an optical axis, the improvement wherein:
said fiber core and cladding have respective indices of refraction selected such that substantially all light rays entering the ends of the fibers, including oblique off-axis rays, are guided through each fiber core by total internal reflection, wherein the cladding absorbs a portion of the guided light rays at each internal reflection such that off-axis light rays experience greater attenuation, wherein the cladding further comprises a thin layer of nonabsorptive cladding having a thickness less than one wavelength of light and a thicker layer of absorptive cladding, the nonabsorptive cladding being interposed between the fiber core and the absorptive cladding to effect a more selective attenuation of the off-axis rays at the interface between the fiber core and the cladding, thereby reducing the effective acceptance angle at the input ends of the fibers and increasing the depth of field of the array.

* * * * *